US012021287B2

(12) United States Patent
Lu et al.

(10) Patent No.: US 12,021,287 B2
(45) Date of Patent: Jun. 25, 2024

(54) RESONATING STRUCTURE FOR A DIELECTRIC FILTER COMPRISING A DIELECTRIC BODY INCLUDING OFFSET FIRST AND SECOND BLIND COUPLING HOLES WITH RESPECTIVE DEFECTED PORTIONS

(71) Applicant: Telefonaktiebolaget LM Ericsson (publ), Stockholm (SE)

(72) Inventors: Peiguang Lu, Beijing (CN); Haitao Liu, Beijing (CN); Weidong Wang, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 310 days.

(21) Appl. No.: 17/310,893

(22) PCT Filed: Mar. 29, 2019

(86) PCT No.: PCT/CN2019/080532
§ 371 (c)(1),
(2) Date: Aug. 27, 2021

(87) PCT Pub. No.: WO2020/198979
PCT Pub. Date: Oct. 8, 2020

(65) Prior Publication Data

US 2022/0149499 A1 May 12, 2022

(51) Int. Cl.
*H01P 1/20* (2006.01)
*H01P 1/205* (2006.01)
(Continued)

(52) U.S. Cl.
CPC .......... *H01P 1/2002* (2013.01); *H01P 1/2053* (2013.01); *H01P 1/2084* (2013.01);
(Continued)

(58) Field of Classification Search
CPC ...... H01P 1/2002; H01P 1/2088; H01P 7/065; H01P 1/2053
(Continued)

(56) References Cited

U.S. PATENT DOCUMENTS 5,208,566 A 5/1993 Kenoun et al.
5,365,209 A * 11/1994 Ito et al. ............... H01P 1/2053 333/202
(Continued)

FOREIGN PATENT DOCUMENTS

CN 103855448 A 6/2014
CN 107069155 A 8/2017
(Continued)

OTHER PUBLICATIONS

International Preliminary Report on Patentability, PCT App. No. PCT/CN2019/080532, dated Oct. 14, 2021, 6 pages.
(Continued)

*Primary Examiner* — Benny T Lee
(74) *Attorney, Agent, or Firm* — Nicholson De Vos Webster & Elliott LLP

(57) ABSTRACT

A resonating structure and a dielectric filter having the same are disclosed. The resonating structure comprises a body, at least one set of negative coupling holes, and a conductive material layer. The body is made of a solid dielectric material and comprises at least two resonators. The negative coupling holes are formed at a connection between two adjacent resonators. Each set of negative coupling holes comprises a first blind hole and a second blind hole disposed on two opposite surfaces of the body respectively. The first blind hole and the second blind hole are offset from each other in a plane perpendicular to a direction along which the first or second blind hole is dug. The conductive material
(Continued)

layer covers surfaces of the body and surfaces of the first blind hole and the second blind hole.

14 Claims, 5 Drawing Sheets

(51) Int. Cl.

| | |
|---|---|
| ***H01P 1/208*** | (2006.01) |
| ***H01P 7/06*** | (2006.01) |
| ***H01P 7/10*** | (2006.01) |

(52) U.S. Cl.
CPC ............ *H01P 1/2088* (2013.01); *H01P 7/065* (2013.01); *H01P 7/10* (2013.01)

(58) Field of Classification Search
USPC .......................................................... 333/208
See application file for complete search history.

(56) References Cited

U.S. PATENT DOCUMENTS

| | | | | |
|---|---|---|---|---|
| 5,731,751 | A | 3/1998 | Vangala | |
| 5,926,079 | A | 7/1999 | Heine et al. | |
| 6,002,307 | A * | 12/1999 | Arakawa | H01P 1/2088 333/135 |
| 10,700,401 | B2 * | 6/2020 | Yuan | H01P 7/10 |
| 2003/0210112 | A1 | 11/2003 | Tada et al. | |

FOREIGN PATENT DOCUMENTS

| | | | |
|---|---|---|---|
| CN | 109309272 | A | 2/2019 |
| CN | 208622916 | U | 3/2019 |
| EP | 3007267 | A1 | 4/2016 |
| WO | 2009/029282 | A1 | 3/2009 |
| WO | 2015/079227 | A1 | 6/2015 |

OTHER PUBLICATIONS

Supplementary European Search Report and Search Opinion, EP App. No. 19922864.4, dated Oct. 13, 2022, 11 pages.
International Search Report and Written Opinion for Application No. PCT/CN2019/080532, dated Jan. 2, 2020, 9 pages.

* cited by examiner

RESONATING STRUCTURE FOR A DIELECTRIC FILTER COMPRISING A DIELECTRIC BODY INCLUDING OFFSET FIRST AND SECOND BLIND COUPLING HOLES WITH RESPECTIVE DEFECTED PORTIONS

CROSS-REFERENCE TO RELATED APPLICATIONS

This application is a National stage of International Application No. PCT/CN2019/080532, filed Mar. 29, 2019, which is hereby incorporated by reference.

TECHNICAL FIELD

The present disclosure generally relates to components of communication device, and, more particularly, to a resonating structure, as well as a dielectric filter, a transceiver and a base station having the resonating structure.

BACKGROUND

This section introduces aspects that may facilitate better understanding of the present disclosure. Accordingly, the statements of this section are to be read in this light and are not to be understood as admissions about what is in the prior art or what is not in the prior art.

Radio transmitters and receivers require filters that enable signals of a specific frequency to pass through while suppressing other unwanted frequencies. With the development of communication technology, filters are required to have the characteristics of low loss, small size, light weight and low cost. Accordingly, dielectric filters that use materials with a high dielectric constant as transmission media, such as ceramic waveguide (CWG) filters, are widely used.

Modern mobile communication systems require both a large out-band suppression and a small insertion loss. Current compact CWG filters cannot maintain a small insertion loss and a large out-band suppression at the same time. This is because, large out-band suppression requires more cascaded resonators, while more cascaded resonators lead to a large insertion loss and a larger filter size. For a filter, to secure a good out-band suppression performance with limited resonators, a "zero point" must be introduced for the filter transmission function.

The "zero point" is a specific frequency point outside the filter pass band, at which no signal can be transmitted. The zero point is dependent on the coupling between the resonators that constitute the filter. There are two types of coupling between resonators: positive coupling (also known as "inductive coupling") and negative coupling (also known as "capacitive coupling"). The number and the position (in frequency domain) of the zero points can be controlled by designing and adjusting the type and strength of coupling between the resonators, thus achieving a fast pass band roll off edge and a good out-band suppression performance.

Limited by the structure of a dielectric filter, the positive coupling between resonators is easy to tune, but the negative coupling is very difficult to achieve. A conventional method is to achieve negative coupling by arranging a metal part between adjacent resonators. For such a method, however, an implementation of the metal part inside the solid resonators is complex, and the negative coupling cannot be easily tuned. Another known method is to achieve negative coupling by providing a blind hole on the body of the resonating structure between adjacent resonators. However, to achieve the required negative coupling, the blind hole may have to be deeply dug, where the term "dug" refers to the extent of a hole or opening disposed in the body, so that the dielectric filter is very fragile and is not robust enough to pass the vibration test and drop test. Moreover, the position of the zero point cannot be adjusted conveniently.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the present disclosure is to provide an improved resonating structure.

According to a first aspect of the present disclosure, there is provided a resonating structure. The resonating structure comprises a body, at least one set of negative coupling holes, and a conductive material layer. The body is made of a solid dielectric material and comprises at least two resonators. The at least one set of negative coupling holes are formed at a connection between two adjacent resonators. Each set of negative coupling holes comprises a first blind hole and a second blind hole disposed on two opposite surfaces of the body respectively. The first blind hole and the second blind hole are offset from each other in a plane perpendicular to a direction along which the first or second blind hole is dug. The conductive material layer covers surfaces of the body and surfaces of the first blind hole and the second blind hole. The negative coupling hole or blind hole here is also known as a "tuning well" to those skilled in the art.

In accordance with an exemplary embodiment, the sum of a depth of the first blind hole and a depth of the second blind hole is larger than a distance between the two opposite surfaces of the body.

In accordance with an exemplary embodiment, the conductive material layer covering the surfaces of the first blind hole and/or the second blind hole is at least partially removed to form a defected portion.

In accordance with an exemplary embodiment, the defected portion is formed at least on a surface of one of the first blind hole and the second blind hole that is adjacent to the other of the first and second blind holes.

In accordance with an exemplary embodiment, two defected portions are formed on a surface of the first blind hole and a surface of the second blind hole respectively, and the two defected portions are at least partially overlapped with each other in a direction parallel to the surface on which the two defected portions are formed.

In accordance with an exemplary embodiment, a quantity/number, a shape, a size, and a location of the defective portion is set to adjust a coupling strength of negative coupling between the two adjacent resonators.

In accordance with an exemplary embodiment, a depth of the first blind hole and/or the second blind hole is set to adjust a coupling strength of negative coupling between the two adjacent resonators.

In accordance with an exemplary embodiment, a distance between the first blind hole and the second blind hole is set to adjust a coupling strength of negative coupling between the two adjacent resonators. The distance here refers to an amount of spacing between two opposed surfaces of the first and second blind holes, in the plane perpendicular to the direction along which the first or second blind hole is dug.

In accordance with an exemplary embodiment, each of the first blind hole and the second blind hole is an elongated hole in a section perpendicular to the direction along which the first or second blind hole is dug.

In accordance with an exemplary embodiment, the first blind hole and the second blind hole are at least partially overlapped with each other in an elongation direction of the elongated hole, that is, when viewed in a direction perpendicular to the elongation direction of the elongated hole.

In accordance with an exemplary embodiment, an amount of overlap between the first blind hole and the second blind hole is set to adjust a coupling strength of negative coupling between the two adjacent resonators.

In accordance with an exemplary embodiment, an elongation direction of the elongated hole is perpendicular to a direction in which the two adjacent resonators are connected.

In accordance with an exemplary embodiment, an elongation direction of the elongated hole is parallel to a direction in which the two adjacent resonators are connected.

In accordance with an exemplary embodiment, an elongation direction of the elongated hole is oblique with respect to a direction in which the two adjacent resonators are connected.

In accordance with an exemplary embodiment, each of the first blind hole and the second blind hole is a rectangle or a rounded rectangle in the section perpendicular to the direction along which the first or second blind hole is dug.

In accordance with an exemplary embodiment, at least one of the first blind hole and the second blind hole is a circular hole or an elliptical hole in a section perpendicular to the direction along which the first or second blind hole is dug.

In accordance with an exemplary embodiment, only one first blind hole and only one second blind hole are included in one set of negative coupling holes.

In accordance with an exemplary embodiment, a plurality of first blind holes and/or a plurality of second blind holes are included in one set of negative coupling holes.

According to a second aspect of the present disclosure, there is provided a dielectric filter comprising at least one resonating structure according to the first aspect.

In accordance with an exemplary embodiment, the dielectric filter comprises a plurality of cascaded resonating structures.

In accordance with an exemplary embodiment, the dielectric filter comprises three resonating structures that are connected to take an L shape.

In accordance with an exemplary embodiment, the dielectric filter comprises four or more resonating structures that are arranged in a matrix form.

According to a third aspect of the present disclosure, there is provided a transceiver comprising a dielectric filter according to the second aspect.

According to a fourth aspect of the present disclosure, there is provided a base station comprising a transceiver according to the third aspect.

BRIEF DESCRIPTION OF THE DRAWINGS

The objects, features and advantages of the disclosure will become apparent from the following detailed description of illustrative embodiments when read in connection with the accompanying drawings, where like features are denoted by the same reference labels throughout the detailed description of the drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure. The term "dug" used herein refers to an extent of a hole or opening that is disposed in a body.

Figure 1A:
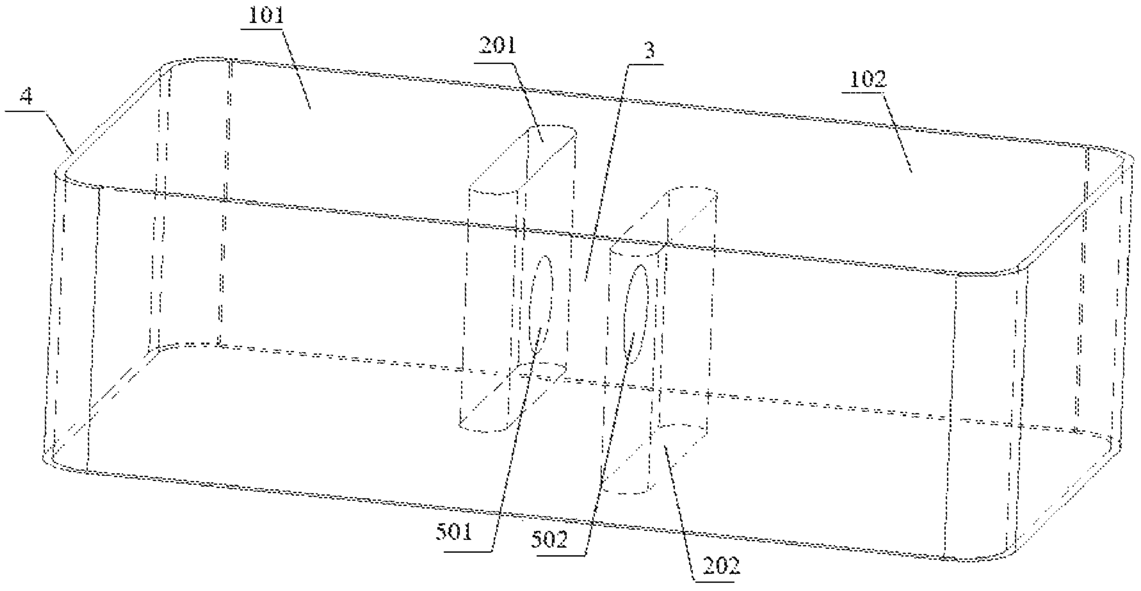
FIG. 1A is a perspective view of a resonating structure according to an embodiment of the disclosure.
Figure 1B:
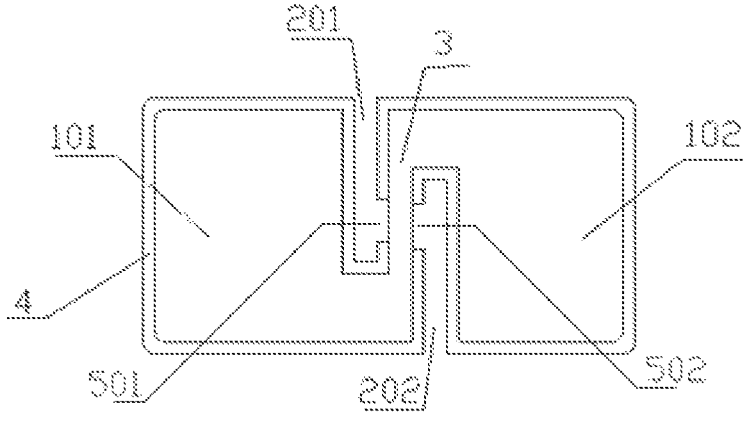
FIG. 1B is a sectional view of the resonating structure shown in FIG. 1A.
Figure 1C:
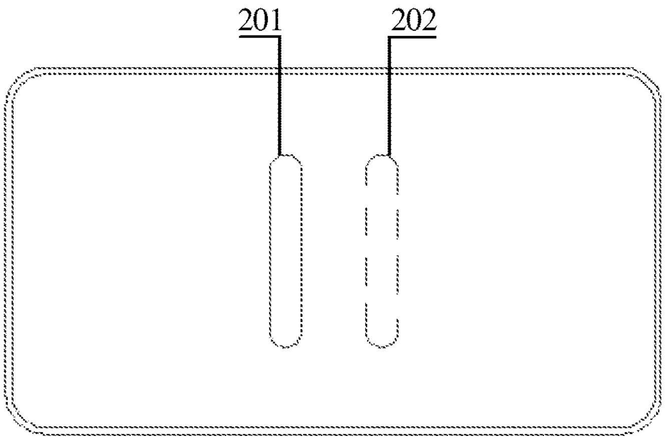
FIG. 1C is a top view of the resonating structure shown in FIG. 1A.

FIGS. 1A, 1B and 1C are a perspective view, a sectional view and a top view of a resonating structure according to an embodiment of the disclosure, respectively. As shown in FIGS. 1A, 1B and 1C, the resonating structure comprises two resonators 101, 102, wherein the resonator 101, the resonator 102, and a connection 3 between the resonators 101 and 102 is composed of a dielectric-bulk integral, or in other words, of a body made of a solid dielectric material (e.g., a ceramic material). The resonating structure further comprises two negative coupling (capacitive coupling) tuning wells 201 and 202 at the connection 3 of the two resonators 101 and 102. As shown in FIGS. 1A, 1B and 1C, the tuning wells 201 and 202 are embodied as blind holes, and will be referred to as negative coupling hole(s) or blind hole (s) hereinafter. The negative coupling hole 201 is formed on a top surface of the body of the resonating structure and is dug toward a bottom surface of the body, while the negative coupling hole 202 is formed on the bottom surface of the body and is dug toward the top surface of the body. That is, the negative coupling holes 201 and 202 are disposed on two opposite surfaces of the body of the resonating structure, respectively. The resonating structure further comprises a conductive material layer 4 covering surfaces of the body and surfaces of the negative coupling holes 201 and 202. The conductive material layer 4 servers in electric functionality as the Ground, and may be a metal layer, for example, a silver layer.

As shown in FIG. 1C, the negative coupling holes 201 and 202 are not overlapped with each other in the top view. In other words, the negative coupling holes 201 and 202 are offset from each other in a plane perpendicular to a direction along which either of the two holes is dug (i.e., a depth direction thereof). Preferably, the negative coupling holes 201 and 202 are completely non-overlapped with each other. The distance between the two negative coupling holes 201 and 202 (i.e., an amount of spacing between two opposed surfaces of the negative coupling holes 201 and 202) is related to the negative coupling strength between the two resonators 101 and 102 (FIGS. 1A and 1B). In the process of electromagnetic simulation or machining, the negative coupling strength between adjacent resonators can be tuned by adjusting the distance between the two negative coupling holes 201 and 202, thus adjusting the position of the zero point of the filters composed of the resonating structures.

The number, shape and depth of the negative coupling holes 201 and 202 are related to the negative coupling strength between the two resonators 101 and 102. In the process of electromagnetic simulation or machining, the negative coupling strength between adjacent resonators can be tuned by adjusting the number, shape and depth of the negative coupling holes 201 and 202, thus adjusting the number and position of the zero point of the filters composed of the resonating structures. Preferably, the sum of a depth of the negative coupling hole 201 and a depth of the negative coupling hole 202 is larger than a distance between the top surface and the bottom surface of the body of the resonating structure. That is, the negative coupling holes 201 and 202 overlaps with each other in the depth direction thereof, as shown in FIG. 1B.

As shown in FIGS. 1A and 1C, the negative coupling holes 201 and 202 are each in a shape of rounded rectangle in a cross section perpendicular to the depth direction thereof. In some other embodiments, however, the negative coupling holes may be formed into other shapes as required, such as plain rectangle, square, circle or ellipse. Besides, the shape of the negative coupling hole 201 may be identical to or different from the shape of the negative coupling hole 202.

As shown in FIGS. 1A and 1B, two defect portions 501 and 502 are provided at the opposed surfaces of the negative coupling holes 201 and 202, respectively. The conductive material layer 4 at the defect portions 501 and 502 is removed. For example, the conductive material layer 4 may be removed by grinding to form the defect portions 501 and 502. That is, at the defect portions 501 and 502, surfaces of the negative coupling holes 201 and 202 are not covered by the conductive material layer. The area of the defect portions 501 and 502 is related to the negative coupling strength between the two adjacent resonators. The negative coupling strength between the resonators 101 and 102 can be tuned by adjusting the number, shape, size and location of the defect portions 501 and 502, thus adjusting the number and position of the zero point of the filters composed by resonating structures.

The defect portions 501 and 502 may be arranged at any position on the surface of the negative coupling holes 201 and 202. Preferably, as shown in FIGS. 1A and 1B, the defect portion 501 is formed on a surface of the first blind hole 201 that is adjacent to the second blind hole 202, and the defect portion 502 is formed on a surface of the second blind hole 202 that is adjacent to the first blind hole 201, thereby achieving better adjustment effect on the negative coupling strength between the resonators 101 and 102. In addition, when viewed in a direction perpendicular to the depth direction of the first blind hole 201 and the second blind hole 202, the defect portions 501 and 502 at least partially overlap with each other, thus achieving better adjustment effect on the negative coupling strength between the two adjacent resonators.

Figure 2:
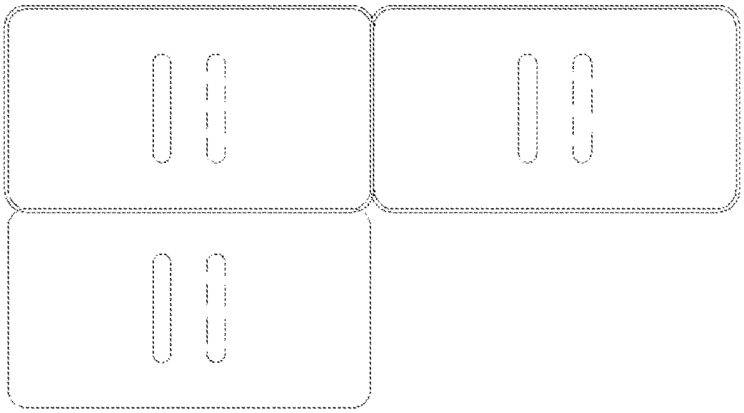
FIG. 2 is a top view of a dielectric filter according to an embodiment of the disclosure, comprising three cascaded resonating structures.

FIG. 2 is a top of a dielectric filter according to an embodiment of the disclosure, which is composed of three cascaded resonating structures as shown in FIGS. 1A-1C. The three resonating structures are connected to take an L shape as shown in FIG. 2. As will be appreciated by those skilled in the art, a suitable number of resonating structures may be connected together in a suitable arrangement as needed. For example, four or more resonating structures may be arranged in a matrix form, for example, a 2×2 matrix, a 2×3 matrix, a 3×3 matrix, etc. In the dielectric filter, two adjacent resonating structures may be connected to each other along common long sides or along common short sides, as shown in FIG. 2.

FIGS. 3A-3I shows a top view of a modified resonating structure according to other embodiments of the disclosure. Hereinafter, only characteristic configurations of these embodiments will be described. For the same features or configurations as those in the embodiment shown in FIGS. 1A-1C, the repetitive descriptions are omitted.

Figure 3A:
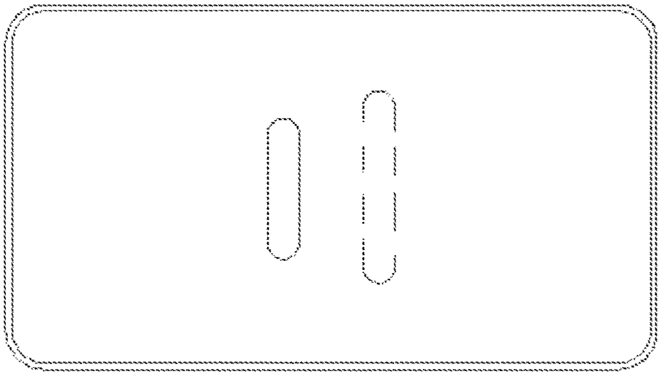
FIG. 3A is a top view of a resonating structure according another embodiment of the disclosure.

The resonating structure shown in FIG. 3A differs from the resonating structure shown in FIGS. 1A-1C in that: the two blind holes 201 and 202 in FIGS. 1A-1C have the same size, while the two blind holes in FIG. 3A have different sizes.

Figure 3B:
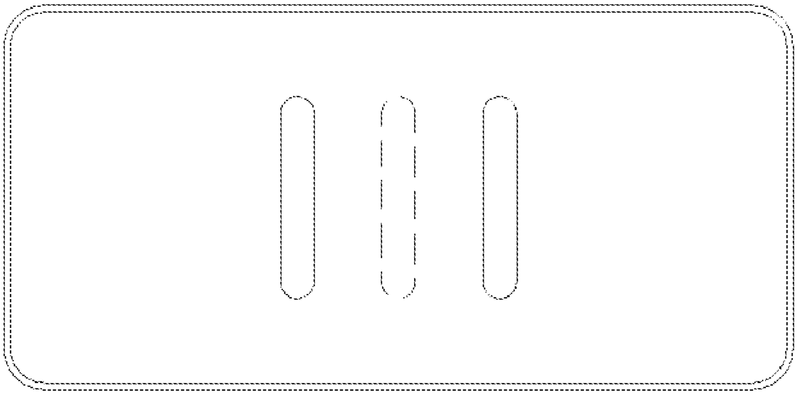
FIG. 3B is a top view of a resonating structure according another embodiment of the disclosure.

The resonating structure shown in FIG. 3B has three blind holes, a middle one of the three blind holes arranged on the bottom surface of the body of the resonating structure as indicated by the dashed line, and the other two of the three blind holes arranged on the top surface of the body. The three blind holes constitute two sets of negative coupling holes. Among the three blind holes, the blind hole dug in a first direction (e.g., from the top surface of the body toward a bottom surface of the body) and the blind hole dug in a second direction which is opposite to the first direction are arranged alternately. For three or more blind holes, blind holes dug in opposite directions are arranged alternately to achieve negative coupling.

Figure 3C:
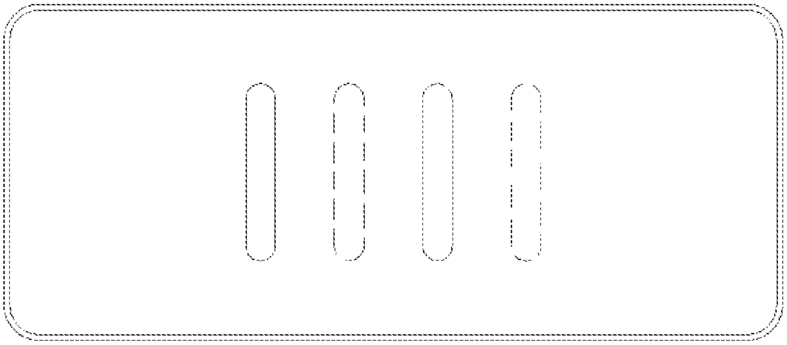
FIG. 3C is a top view of a resonating structure according another embodiment of the disclosure.

The resonating structure shown in FIG. 3C has four blind holes, two of the four blind holes arranged on the top surface of the body of the resonating structure, and the other two arranged on the bottom surface of the body as indicated by the dashed line. The four blind holes constitute three sets of negative coupling holes.

Figure 3D:
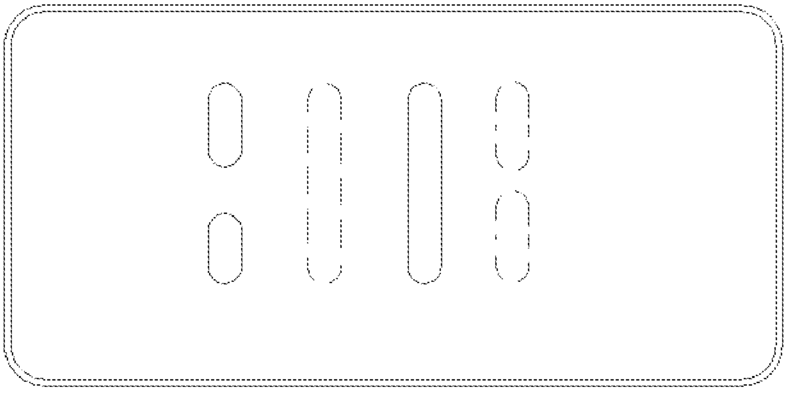
FIG. 3D is a top view of a resonating structure according another embodiment of the disclosure.

The resonating structure shown in FIG. 3D differs from the resonating structure shown in FIG. 3C in that: the leftmost blind hole in FIG. 3C is replaced with two blind holes in FIG. 3D, and the rightmost blind hole in FIG. 3C is also replaced with two blind holes in FIG. 3D.

Figure 3E:
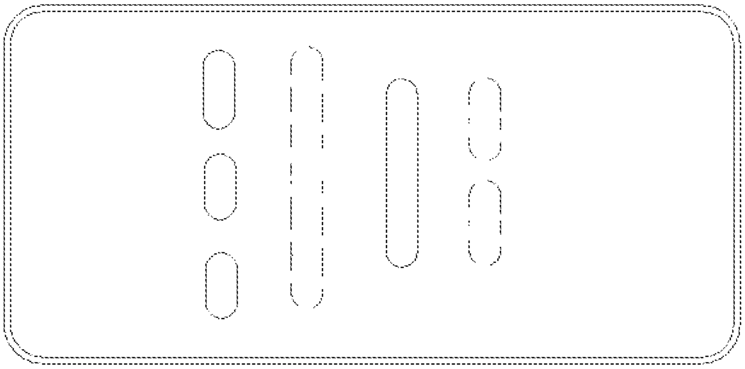
FIG. 3E is a top view of a resonating structure according another embodiment of the disclosure.

The resonating structure shown in FIG. 3E differs from the resonating structure shown in FIG. 3C in that: the leftmost blind hole in FIG. 3C is replaced with three blind holes in FIG. 3E, and the rightmost blind hole in FIG. 3C is replaced with two blind holes in FIG. 3E. Besides, in the resonating structure shown in FIG. 3E, the two middle blind holes have different sizes.

Figure 3F:
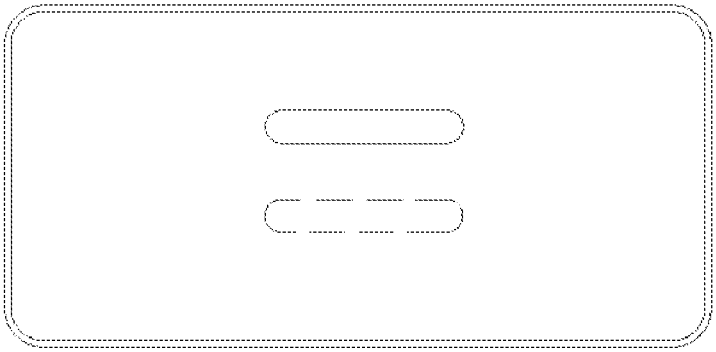
FIG. 3F is a top view of a resonating structure according another embodiment of the disclosure.

The resonating structure shown in FIG. 3F differs from the resonating structure shown in FIGS. 1A-1C in that: an elongation direction of the two blind holes in FIGS. 1A-1C is perpendicular to the direction in which the two adjacent resonators 101 and 102 are connected, while an elongation direction of the two blind holes in FIG. 3F is parallel to the direction in which the two resonators are connected.

Figure 3G:
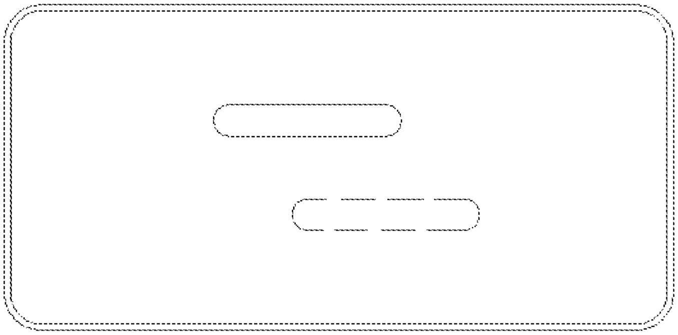
FIG. 3G is a top view of a resonating structure according another embodiment of the disclosure.

The resonating structure shown in FIG. 3G differs from the resonating structure shown in FIG. 3F in that: when viewed in a direction perpendicular to the long sides of the elongated holes, the two blind holes in FIG. 3F completely overlap with each other, while the two blind holes in FIG. 3G partially overlap with each other. An amount of overlap in the elongation direction of the elongated hole can also be set to adjust the negative coupling strength between the two adjacent resonators.

Figure 3H:
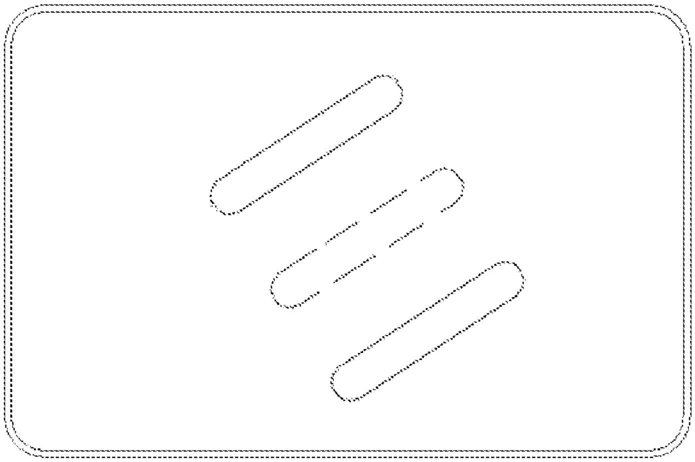
FIG. 3H is a top view of a resonating structure according another embodiment of the disclosure.

The resonating structure shown in FIG. 3H differs from the resonating structure shown in FIG. 3B in that: the elongation direction of the three blind holes in FIG. 3B is perpendicular to the direction in which the two adjacent resonators are connected, while the elongation direction of the three blind holes in FIG. 3H is oblique with respect to the direction in which the two adjacent resonators are connected.

Figure 3I:
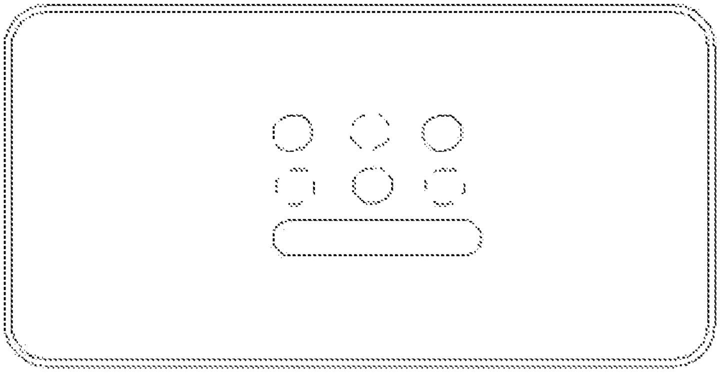
FIG. 3I is a top view of a resonating structure according another embodiment of the disclosure.

The resonating structure shown in FIG. 3I has seven blind holes in total, one of the seven blind holes having a rounded rectangular cross section and the other six of the seven blind holes having a circular cross section.

For FIGS. 1A, 2, 3A-3I above, the elongation direction of the elongated holes is perpendicular to a direction along which the blind hole is dug.

The resonating structure according to embodiments of the disclosure at least has the following advantages.

Each of the above embodiments of the disclosure provides an interleaved resonating structure, in which at least one set of negative coupling holes (tuning wells) are formed at a connection between two adjacent resonators, each set of negative coupling holes comprising a first blind hole and a second blind hole disposed on two opposite surfaces of the body respectively, the first blind hole and the second blind hole being offset from each other in a plane perpendicular to a direction along which the first or second blind hole is dug. Accordingly, negative coupling between adjacent resonators can be easily achieved without adding any additional metal part and without causing any extremely fragile joint between the adjacent resonators.

Preferably, the sum of a depth of the first blind hole and a depth of the second blind hole is larger than a distance between the two opposite surfaces of the body. This enables an easy tuning of the negative coupling between the adjacent resonators.

Preferably, the conductive material layer covering the surfaces of the first blind hole and/or the second blind hole is at least partially removed to form one or more defected portions. This facilitates a fine tuning of the negative coupling on the production line, and makes the mass production easier to carry out. As a result, the production cost is lower, and the stability of the dielectric filter is better.

According to at least some of the embodiments of the disclosure, negative coupling strength between adjacent resonators, and thus the zero point(s) demanded by the dielectric filter composed of the resonating structure, can be easily tuned by adjusting one or more of the following parameters: the number, the depth and/or the shape of the blind holes; the distance between two adjacent first and second blind holes in a plane perpendicular to a direction along which the first or second blind hole is formed into the body; the amount of overlap of two adjacent first and second blind holes in a direction perpendicular to the direction along which the first or second blind hole is formed into the body; and the number, the shape, the size and/or the location of the defect portions. Accordingly, low insertion loss and good out-band suppression performance can be secured with limited resonating structures.

The present disclosure also relates to a transceiver comprising a dielectric filter described above, and a base station comprising a transceiver comprising a dielectric filter described above.

References in the present disclosure to “an embodiment”, “another embodiment” and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of those skilled in the art to implement such feature, structure, or characteristic in connection with other embodiments whether or not explicitly described.

It should be understood that, although the terms “first”, “second” and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term “and/or” includes any and all combinations of one or more of the associated listed terms.

The terminology used herein is for the purpose of describing particular embodiments only and is not intended to limit the present disclosure. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components, but do not preclude the presence or addition of one or more other features, elements, components and/or combinations thereof. The terms “connect”, “connects”, “connecting” and/or “connected” used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant art in view of the foregoing description, when read in conjunction with the accompanying drawings. However, any and all modifications will still fall within the scope of the non-limiting and exemplary embodiments of this disclosure.

The invention claimed is:

1. A dielectric filter comprising:

a resonating structure having:

a body made of a solid dielectric material, comprising two resonators;

at least one set of capacitive coupling holes formed in the body and disposed between the two resonators, wherein each set of capacitive coupling holes comprising a first blind hole extending partially inward from one surface of the body and a second blind hole extending partially inward from an opposite surface of the body and wherein the first blind hole and the second blind hole are offset from each other in which a portion of the body residing between the first blind hole and the second blind hole forms a connection between the two resonators; and a conductive material layer covering outer surfaces of the body and portions of surfaces of the body forming the first blind hole and the second blind hole, wherein surface areas of the body forming the first blind hole and the second blind hole are devoid of the conductive material layer to thereby form a respective defected portion and wherein the respective defected portion of the first blind hole and the second blind hole face each other and are at least partially overlapped with each other.

2. The dielectric filter according to claim 1, further comprising:

a plurality of the resonating structures that are cascaded;

three of the plurality of resonating structures are arranged in an L shape; or four or more of the resonating structures that are arranged in a matrix form.

3. A resonating structure, comprising:

a body made of a solid dielectric material, comprising two resonators;

at least one set of capacitive coupling holes formed in the body and disposed between the two resonators, wherein each set of capacitive coupling holes comprising a first blind hole extending partially inward from one surface of the body and a second blind hole extending partially inward from an opposite surface of the body and wherein the first blind hole and the second blind hole are offset from each other in which a portion of the body residing between the first blind hole and the second blind hole forms a connection between the two resonators; and a conductive material layer covering outer surfaces of the body and portions of surfaces of the body forming the first blind hole and the second blind hole, wherein surface areas of the body forming the first blind hole and the second blind hole are devoid of the conductive material layer to thereby form a respective defected portion and wherein the respective defected portion of the first blind hole and the second blind hole face each other and are at least partially overlapped with each other.

4. The resonating structure according to claim 3, wherein at least one of the first blind hole and the second blind hole is a circular hole or an elliptical hole in a direction perpendicular to a direction along which the first blind hole and the second blind hole are formed inward into the body.

5. The resonating structure according to claim 4, wherein:

only one first blind hole and only one second blind hole are included in the at least one set of capacitive coupling holes; or a plurality of first blind holes, a plurality of second blind holes, or both the plurality of first blind holes and the plurality of second blind holes, are included in the at least one set of capacitive coupling holes.

6. The resonating structure according to claim 3, wherein a quantity, a shape, a size, and a location of the respective defected portions are set to adjust a coupling strength of capacitive coupling between the two resonators.

7. The resonating structure according to claim 3, wherein a depth of the first blind hole, the second blind hole, or both the first blind hole and the second blind hole, is respectively set to adjust a coupling strength of capacitive coupling between the two resonators.

8. The resonating structure according to claim 3, wherein a distance between the first blind hole and the second blind hole is set to adjust a coupling strength of capacitive coupling between the two resonators.

9. The resonating structure according to claim 3, wherein each of the first blind hole and the second blind hole is a respective elongated hole in a direction perpendicular to a direction along which the first blind hole and the second blind hole are formed inward into the body.

10. The resonating structure according to claim 9, wherein the first blind hole and the second blind hole are at least partially overlapped with each other and are aligned in an elongation direction of each elongated hole.

11. The resonating structure according to claim 10, wherein an amount of overlap between the first blind hole and the second blind hole is set to adjust a coupling strength of capacitive coupling between the two resonators.

12. The resonating structure according to claim 9, wherein:

an elongation direction of each of the elongated hole is perpendicular to a direction in which the two resonators are connected;

an elongation direction of each of the elongated hole is parallel to a direction in which the two resonators are connected; or an elongation direction of each of the elongated hole is oblique with respect to a direction in which the two resonators are connected.

13. The resonating structure according to claim 9, wherein each of the first blind hole and the second blind hole that has the respective elongated hole is either a is a rectangle or a rounded rectangle.

14. The resonating structure according to claim 3, wherein a sum of a depth of the first blind hole and a depth of the second blind hole is larger than a distance between the one surface and the opposite surface of the body.

* * * * *